Dec. 29, 1936.    R. L. BEERS    2,065,554
CINDER SEPARATOR
Filed April 9, 1934    2 Sheets—Sheet 1

INVENTOR
Royce L. Beers
BY
ATTORNEYS

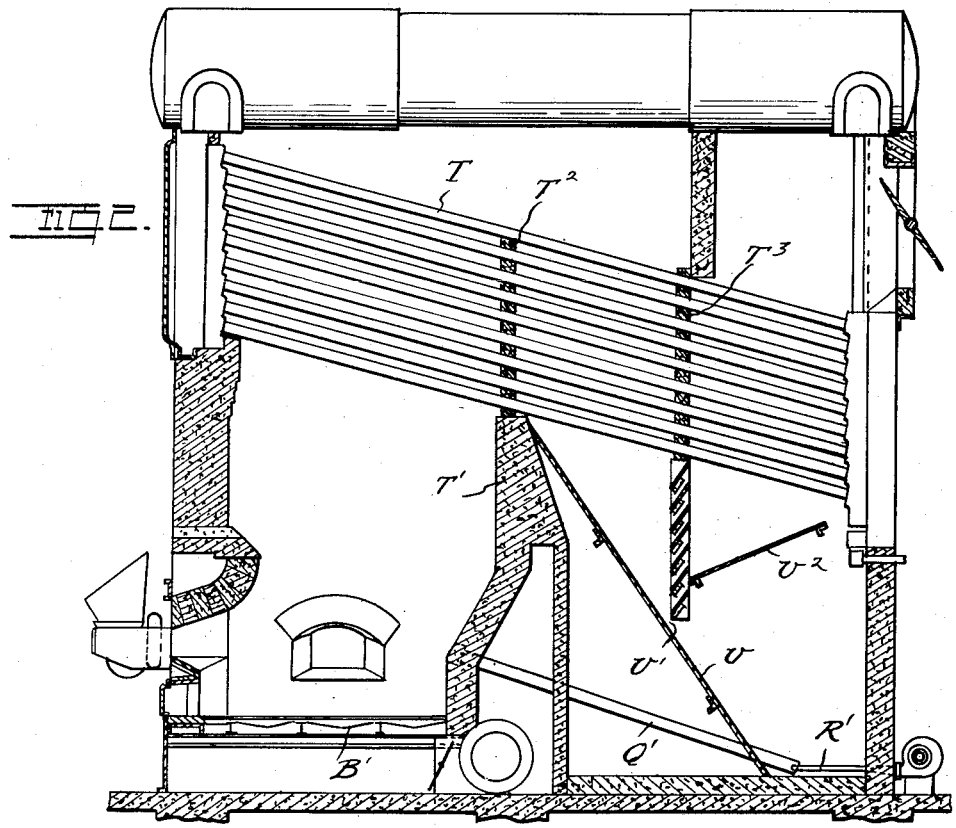

Patented Dec. 29, 1936

2,065,554

UNITED STATES PATENT OFFICE 2,065,554

CINDER SEPARATOR

Royce L. Beers, Detroit, Mich., assignor to Detroit Stoker Company, Detroit, Mich., a corporation of Michigan Application April 9, 1934, Serial No. 719,762

3 Claims. (Cl. 110—165)

The invention relates to cinder and ash separating means designed for use in connection with various types of furnaces and the invention consists in the novel construction as hereinafter set forth.

In the drawings:

Figure 2 is a similar view showing the cinder arresting means applied to a furnace of a different type.

Figure 1:
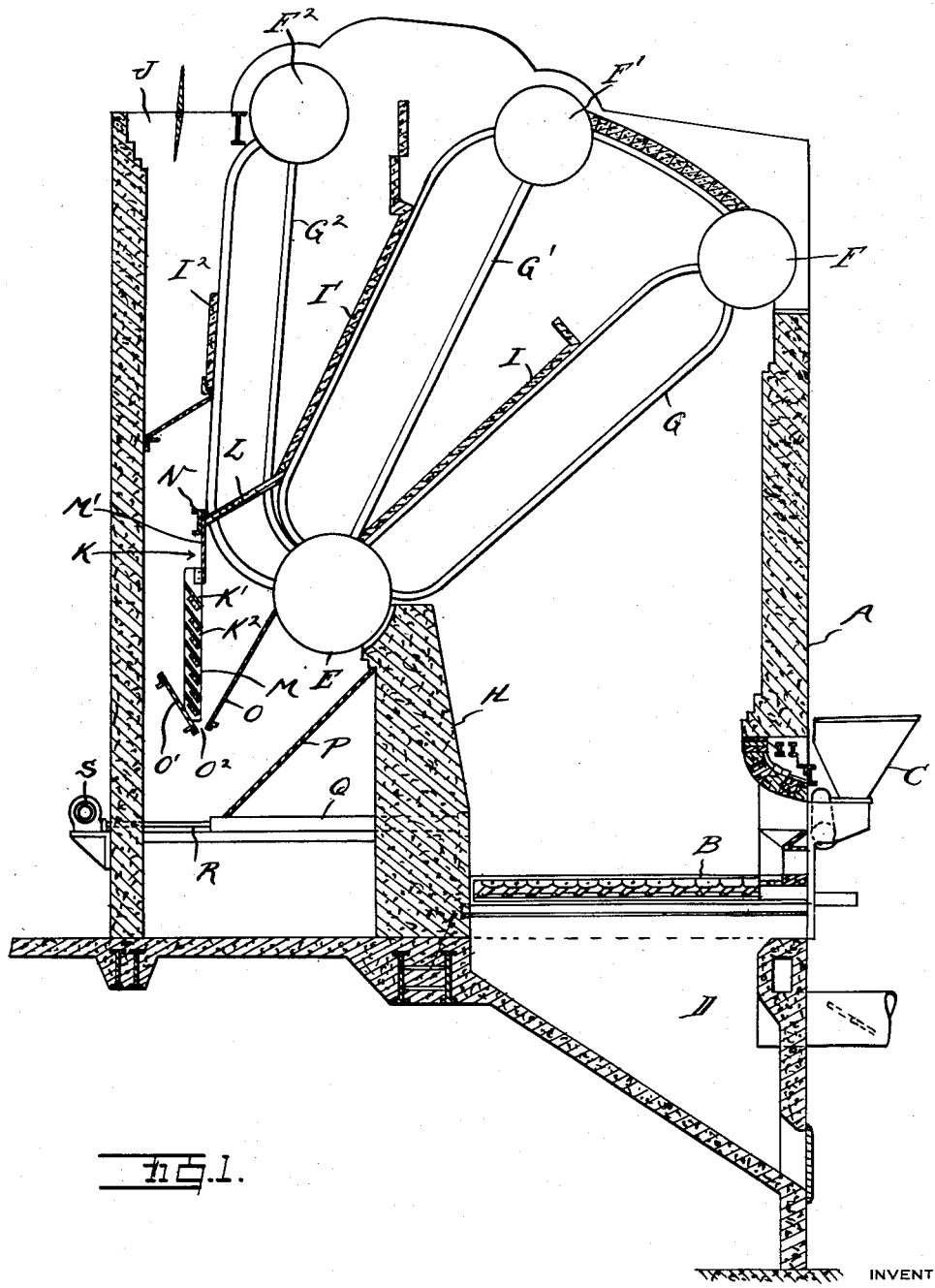
Figure 1 is a vertical section through a boiler furnace of one type to which my improvement is applied.

As shown in Figure 1, A is a furnace provided with a grate B, a stoker C and ash pit D. Within the furnace chamber is arranged a boiler of the water tube type including a lower header or drum E, a series of upper headers or steam drums F, F', F$^2$ connected to the lower headers by tubes G, G', G$^2$ extending at different angles. The drum E is supported upon the bridge wall H, and baffles I, I', I$^2$ are arranged to direct the gaseous products of combustion upward and downward around the tubes G before passing to the stack J. The furnace and boiler just described is of a common type and forms no part of the present invention excepting as hereinafter set forth.

To remove the cinders and ash from the combustion gases before passing to the stack, I have devised arresting means of the following construction. K is a separator arranged in substantially vertical position and in the lower portion of the furnace chamber on the opposite side of the bridge wall H from the grate B. As shown, the member K is arranged in rear of and extends below the header E and its upper portion is connected to an extension L of the baffle I', the arrangement being such that the gaseous products are directed downward beneath the baffles I', L and through the separator K before passing upward to the stack J. The member K is formed by a series of inclined spaced plates K', K$^2$, etc., these being arranged substantially at right angles to the direction of movement of the descending gaseous products and compelling said products to make a right angle turn before passing upward between the plates. The plates K', K$^2$, etc. are connected at their opposite ends to vertical supporting bars M which hold them in fixed position, and above the upper bar K' is an imperforate vertically extending plate M' connecting with the baffle extension L. The structure may be supported by any suitable means such as a metallic cross beam N from which it is suspended. O, O' are plates arranged on opposite side of the member K and converging toward their lower ends to form a throat O$^2$ of restricted area. The upper end of the plate O abuts against the header E and the upper end of the plate O' is separated from the wall of the furnace to form a restricted opening therebetween.

With the construction as thus far described, the gaseous products of combustion of the fuel on the grate B will pass upward around the tubes G and over the baffle I, then downward between the baffles I, I' and through the openings between the inclined plates K', K$^2$, etc. then upward around the tubes G$^2$ and finally to the stack J. Carried in suspension by these gases are cinders and ash which in the downward portion of the current impinge upon the plates K', K$^2$ which are substantially at right angles to their direction of movement. These plates will thus arrest the cinder particles and because of the sharp upward incline of the plates, said particles will drop downward into the throat O$^2$ between the inclined plates O, O'. A small portion of the gases will descend with the cinder particles but due to the restriction of the throat O$^2$, the velocity of the gases beyond said throat is so diminished as to permit the cinders to drop from suspension. Thus the gases free from cinders can pass upward through the throat between the plate O' and the furnace wall and join the other gases passing toward the stack.

The cinders which are thus dropped from the gaseous current accumulated at the bottom of a hopper formed by an inclined wall P and are then returned to the furnace chamber at a point just above the grate. The returning means consist of a horizontal conduit Q and an ejector formed by an air blast nozzle R supplied with air from a fan S. Thus the cinders will be dropped on top of the fuel on the grate B and any combustible elements thereof will be consumed, while the incombustible elements will pass with the ash through the grate and into the ash pit D.

With the construction shown in Figure 2 the furnace and boiler are of a different type, the boiler tubes T inclining downward from the front wall toward the rear wall of the furnace chamber and being centrally supported on the bridge wall T'. A refractory baffle T$^2$ is arranged above the bridge wall T' between the tubes so as to compel the gases ascending from the grate to pass upward through the forward portion of the tubes T and then downward. A similar baffle T$^3$ is arranged between the tubes in rear of the bridge wall T' and beneath this baffle is arranged the separator K which is substantially the same in construction as that previously described. The lower end of the separator is spaced from an inclined wall U to form therebetween a restricted throat U' and a baffle plate U² is arranged to perform a similar function to that of the baffle O' previously described. Thus the cinders arrested by impinging against the plates K', K², etc. of the separator K will drop through the throat U' and will accumulate in the chamber beneath the plate U². At the lower end of this chamber is an ejector nozzle R' which directs the cinders upward through a conduit Q' to a point where they will fall upon the fuel on a grate B'.

With each of the two modifications described, the function performed is substantially the same. In each the gases carrying the cinders in suspension pass downward in an inclined direction. In each the plates K', K² of the separator are arranged at substantially right angles to the path of the descending gases and compel them to make a right angle turn before passing upward. In each the momentum of the solid particles or cinders is overcome by striking the plates so that these particles are permitted to drop by gravity through the restricted throat into a settling chamber. Thus the device is very efficient in removing cinders and ash and permitting only the gaseous products to pass to the stack.

It will be noted that in each of the constructions described, the separator is arranged below the boiler and is placed in space within the boiler setting which is not used for any other purpose. Thus in the construction as shown in Fig. 1, the separator is in the rear and below the header E and the space in which it is located is available between the bridge wall H and the rear wall of the furnace or boiler setting.

What I claim as my invention is:

1. The combination with a boiler furnace of the type having a cinder collecting chamber into which flow the gases of combustion from the fire chamber, such furnace having heat exchange tubes therein and a baffle cooperating with said tubes to cause a down flow of the gases in heat exchange relation to the tubes, such baffle terminating above the bottom of the cinder chamber to provide for flow of gases beneath the baffle and the baffle normally operating to cause a part of the cinders to separate and collect in the cinder chamber; of a series of inclined and vertically spaced plates located as a continuation of the lower end of the baffle whereby to complete the separation of the cinders and to direct them to the bottom of the cinder collecting chamber.

2. The combination with a boiler furnace of the type having a cinder collecting chamber into which flow the gases of combustion from the fire chamber, such furnace having heat exchange tubes therein and a baffle cooperating with said tubes to cause a down flow of the gases in heat exchange relation to the tubes, such baffle terminating above the bottom of the cinder chamber to provide for flow of gases beneath the baffle and the baffle normally operating to cause a part of the cinders to separate and collect in the cinder chamber; of additional cinder separating means located in said cinder collecting chamber beneath said baffle.

3. The combination with a boiler furnace of the type having a cinder collecting chamber into which flow the gases of combustion from the fire chamber, such furnace having heat exchange tubes therein and a baffle cooperating with said tubes to cause a down flow of the gases in heat exchange relation to the tubes, such baffle terminating above the bottom of the cinder chamber to provide for flow of gases beneath the baffle and the baffle normally operating to cause a part of the cinders to separate and collect in the cinder chamber; and additional cinder separating means located in said cinder collecting chamber comprising a series of spaced plates forming a downward continuation of said baffle and crossing the path of the gases flowing beneath the baffle.

ROYCE L. BEERS.